United States Patent [19]

Vogt-Birnbrich et al.

[11] Patent Number: 5,552,496

[45] Date of Patent: Sep. 3, 1996

[54] AQUEOUS POLYURETHANE RESIN DISPERSION, PROCESSES FOR ITS PREPARATION, AND ITS USE IN AQUEOUS COATING COMPOSITIONS

[75] Inventors: Bettina Vogt-Birnbrich, Solingen; Hans-Peter Patzschke, Wuppertal; Werner Lenhard, Wuppertal; Walter Schubert, Wuppertal, all of Germany

[73] Assignee: Herberts Gesellschaft mit beschrankter Haftung, Wuppertal, Germany

[21] Appl. No.: 394,553

[22] Filed: Feb. 27, 1995

Related U.S. Application Data

[63] Continuation of Ser. No. 112,182, Aug. 25, 1993, abandoned.

[30] Foreign Application Priority Data

Aug. 27, 1992 [DE] Germany ............... 42 28 510.6

[51] Int. Cl.$^6$ ............................ C08G 18/80
[52] U.S. Cl. ............... 525/440; 252/182.28; 427/385.5; 525/454; 525/456; 525/457; 528/45; 528/75; 528/71; 528/84; 528/245; 528/266; 528/271
[58] Field of Search ............. 524/591, 871, 524/873, 874, 802; 528/45, 84, 75, 245, 266, 271, 71, 440; 525/440, 454, 456, 457; 427/385.5; 252/182.28

[56] References Cited

U.S. PATENT DOCUMENTS 5,147,925  9/1992  Pears et al. ................. 524/589
5,254,637  10/1993 Witzeman et al. ................. 428/458
5,266,630  11/1993 Noomen et al. ................. 524/821

*Primary Examiner*—Rachel Johnson
*Attorney, Agent, or Firm*—Schweitzer Cornman & Gross

[57] ABSTRACT

An aqueous coating composition which is self-drying or is crosslinked by external agents, processes and dispersions for its preparation and its use. The coating composition comprises:

I) 40 to 100% by weight of a film-former in the form of an aqueous dispersion of one or more polyurethane resins having a number-average molecular mass (Mn) of from 2500 to 1,000,000 and a content of ionic groups, groups which can be converted to ionic groups, and/or hydrophilic groups of from 5 to 200 meq per 100 g of solid resin, and at least one CH-acid group per molecule and a OH-number of 0 to 100, wherein some or all of the Ch-acid groups can be reacted with one ore more compounds which are able to react with at least two CH-acid groups for chain-lengthening, and II) 60 to 0% by weight of one or more crosslinkers based on compounds which can react with at least two CH-acidic groups, based on formaldehyde condensation resins and/or polyisocyanates containing free or blocked isocyanate groups, the percentages by weight of I) and II) relating to the resin solids content and adding up to 100% by weight, and optionally pigments, fillers, organic solvents and/or conventional coating additives.

14 Claims, No Drawings

AQUEOUS POLYURETHANE RESIN DISPERSION, PROCESSES FOR ITS PREPARATION, AND ITS USE IN AQUEOUS COATING COMPOSITIONS

This is a continuing application of U.S. Ser. No. 08/112,182, filed on Aug. 25, 1993, now abandoned.

The contents of German application No. P 42 28 510.0 is incorporated herein by reference thereto The invention relates to water-thinnable coating compositions, to their preparation from polyurethane resin dispersions which are suitable for this purpose, and to the use of the coating compositions.

In automotive finishes in particular, but also in other sectors in which coatings having a good decorative effect and, at the same time, good corrosion protection are desired, it is known to provide substrates with a plurality of coats which are arranged over one another. This generally involves applying first a corrosion protection coat or an adhesion-promoting coat and then a stone chip-resistant coat and a coloured coating composition, and then applying a transparent coat, i.e. in general a clearcoat which contains only transparent pigments or none at all. Metallic pigments are often used in the coloured basecoat, giving so-called metallic finishes.

The industrial practice of automotive finishing previously involved the use of conventional coating compositions containing a high proportion of organic solvents. On economic grounds and to reduce environmental pollution, efforts are being made to avoid as far as possible the use of organic solvents in coatings.

Coating compositions which contain predominantly water as the solvent or dispersant, and only contain small residual amounts of organic solvents, are known. Likewise, the use of polyurethane dispersions (PU dispersions) in basecoats is known. For instance, EP-A-0 089 497 describes metallic basecoats which contain aqueous dispersions of PU. These binders contain ionic groups in the molecule. They are formed by synthesis of an NCO-containing prepolymer which is chain-lengthened in aqueous dispersion with diamines.

EP-A-0 044 480, DE-A-30 27 198 and DE-A-39 15 459 describe PU dispersions where NCO-terminal prepolymers are chain-lengthened with water to give polyurethanes. The resulting PU dispersions are employed together with other binders in basecoat compositions. When preparing PU dispersions via NCO prepolymers, it is generally not possible to work in the absence of solvents, since NCO-terminal prepolymers, even of low molecular weight, cannot be handled without adding solvents.

DE-A-39 03 804 and DE-A-40 01 841 describe a chain-lengthening of OH-terminal or amino-functional prepolymers using polyisocyanates.

In the preparation of the PU dispersions described in the above disclosures, the chain-lengthening of prepolymers is carried out exclusively by the formation of C-N or C-O bonds. No description has previously been given of chain-lengthening involving the formation of C-C bonds or the utilization of CH-acidic centres, nor has the use of such dispersions for the preparation of aqueous coating compositions.

EP-A-0 367 051 discloses aqueous PU dispersions which carry carbonyl groups, incorporated by reaction, and carboxyl groups. These functionalized polyurethanes are applied from aqueous dispersion. In the dry film, crosslinking takes place via the carbonyl groups using polyhydrazides, with the formation of a C-N bond. Reactions at the carbon atom adjacent to the carbonyl group are not described.

The known aqueous coating compositions which contain PU dispersions exhibit disadvantages in their adhesion to the subsequent coats of multicoat finishes. Problems occur in particular in the damp heat resistance; in other words, when the coatings are subjected to increased temperature and atmospheric humidity, delamination or blistering is observed. A further disadvantage of such dispersions is their content of organic solvent. The solvent content can at best be reduced by an additional distillation step in the dispersion phase.

The object of the present invention is to provide low-solvent aqueous coating compositions based on polyurethane resins, which are distinguished by good inter-coat adhesion in multicoat finishes and which additionally produce good metallic effects.

This object is achieved by forming the aqueous coating composition, one subject of the invention, which is self-drying or crosslinks by means of external agents, and comprises:

I) 40 to 100 preferably 60 to 100 and especially 65 to 100 % by weight of a film-former in the form of an aqueous dispersion of one or more polyurethane resins having a number-average molecular mass (Mn) of from 2500 to 1,000,000 and a content of ionic groups, groups which can be converted to ionic groups and/or hydrophillic groups of from 5 to 200 meq per 100 g of solid resin, and at least one CH-acid group per molecule, and a OH-number of 0 to 100, wherein some or all of the CH-acid groups can be reacted with one or more compounds which are able to react with at least two CH-acid groups for chain-lengthening, and II) 60 to 0 preferably 40 to 0 and especially 35 to 0 % by weight of one or more crosslinkers based on compounds which can react with at least two CH-acid groups or based on formaldehyde condensation resins and/or polyisocyanates containing free or blocked isocyanate groups, the percentages by weight of I) and II) relating to the resin solids content and adding up to 100% by weight, and optionally pigments, fillers, organic solvents and/or conventional coating additives.

In component I) there are from 5 to 200 meq (milliequivalents) of ionic groups, groups which can be converted to ionic groups, and/or hydrophilic groups per g of solid resin.

Where the ionic groups are anionic, they are preferably present at more than 15 and less than 100 and particularly preferably at more than 20 and less than 60 meq/100 g of solid resin.

Where the ionic groups are cationic they are preferably present at more than 30 and less than 150, particularly preferably at more than 45 and less than 100 meq/100 g of solid resin.

In the case of the hydrophilic groups, the 5 to 200 meq relate to the lowest molecular weight components of such groups; for example, in polyethylene oxide groups, to ethylene oxide units (such units are also called repeating units).

Examples of the ionic groups, groups which can be converted to ionic groups, and hydrophilic groups contained in component I) of the coating compositions according to the invention are evident from the following description relating to the preparation of component I). They are given, for example, for the subsequently defined component c).

Examples of groups which can react with at least two CH-acidic groups are likewise evident from the following description, for example in the definition of component D)

such as mono or polyaldehydes which can be multi-functional aldehydes or condensation products of monoaldehydes and/or di- and polyisocyanates containing at least 1.5 isocyanate functions per molecule.

The polyurethane resins which contain at least one CH-acidic group and are employed in component I) of the coating compositions according to the invention can be prepared in a variety of ways. It is for example possible to use polyurethane resins whose preparation is described in EP-A-0 367 051. They are prepared by reacting one or more organic polyisocyanates with one or more compounds containing more than one group which is reactive with isocyanate, and at least one ionic group, group which is capable of ion formation, and/or hydrophilic group, one or more mono- or polyalcohols which contain at least one CH-acidic group, optionally one or more chain-lengthening agents (e.g. amines and/or polyols) and optionally one or more polyhydroxy compounds.

A further route to the preparation of the dispersion of a polyurethane resin (component I) which contains. at least one CH-acidic group proceeds according to the invention by reacting:

A) at least one polyurethane resin (component A) which contains hydroxyl groups and may contain urea groups, contains at least one ionic group, group capable of ion formation and/or hydrophilic group per molecule and has an OH number of from 10 to 150, preferably more than 15 and less than 100, in an anhydrous medium, with B) at least one compound (component B) which has at least one functional group suitable for reaction with at least some of the OH groups of the polyurethane resin and additionally contains a CH-acid group or forms a CH-acid group during the reaction, and C) converting of some or all of the groups capable of ion formation which are present in the resulting product to the ionized form, and transferring the resulting product to the aqueous phase.

The content of CH-acidic groups in a polyurethane resin of component I) containing groups of this type, is preferably from 20 to 450 meq and particularly preferably more than 40 and less than 300 meq, based in each case on 100 g of solid resin.

These polyurethane resins containing at least one CH-acidic group have number-average molecular masses of, for example, from 2,500 to 1,000,000.

For direct use in aqueous coating compositions, those polyurethane resins containing CH-acidic groups are used whose number-average molecular mass (Mn) is preferably from 5,000 to 500,000. Those having a number-average molecular mass of, for example, from 5,000 to 100,000 are preferred for this purpose. Particular preference is given to those having a number-average molecular mass of more than 5,000 and less than 50,000.

Polyurethane resins containing CH-acidic groups and having a relatively low number-average molecular mass of, for example, from 2,500 to 50,000 are preferably subjected to chain-lengthening with one or more compounds which are able to react with at least two CH-acid groups, to furnish enhanced moleculare weights of preferably more than 5,000 and less than 1,000,000.

A further subject of the invention is therefore the process below for the preparation of the chain-lengthened polyurethane dispersions which can be used as component I), and the resulting aqueous dispersions, the process being characterized in that one or more water-dispersible polyurethane resins containing ionic groups, groups which can be converted to ionic groups, and/or hydrophilic groups and at least one CH-acidic group per molecule and having a number-average molecular mass (Mn) of from 2500 to 50,000 is or are reacted in an aqueous or nonaqueous medium with one or more compounds which can react with at least two CH-acidic groups (component D), for chain-lengthening, and a reaction product obtained in a nonaqueous medium is optionally transferred to the aqueous phase.

In accordance with the invention, a polyurethane resin which can be used as a starting material for the preparation of component I) and which contains OH groups (component A) can be prepared by reacting, in an anhydrous mediumn a) at least one linear or branched compound which carries at least two groups which are reactive towards isocyanate and has an average molecular weight of from 60–10,000, preferably from 60–6,000, b) at least one organic polyisocyanate, in particular diisocyanate, c) at least one compound Containing more than one group which is reactive with isocyanate, and at least one ionic group, group capable of ion formation and/or hydrophilic group, and having number-average molecular mass (Mn) of up to 10,000, preferably up to 2,000, and an OH/NCO ratio of more than 1 to 4:1.

In accordance with a preferred embodiment of the invention, the abovementioned linear or branched compound of component a) is at least one polyol based on one or more polyethers, polyesters and/or polycarbonates, containing at least two OH groups per molecule and having a number-average molecular mass (Mn) of from 600–10,000, preferably more than 1,000 and less than 5,000, with the optional additional use of one or more at least difunctional low molecular weight alcohols and/or amines with a molecular mass of below 600 and preferably below 400.

Component A) can, however, also be prepared in the following way. It is possible, for example, to start from a prepolymer containing terminal NCO groups, which is then reacted with e.g. an aminopolyol. The prepolymer is obtained by reacting one or more polyisocyanates, as indicated, for example, for component b), with one or more compounds as indicated for component a) and/or with at least one compound as indicated for component c).

If desired, the reaction may also involve one or more at least difunctional low molecular weight alcohols and/or amines having a molecular mass of below 600. The NCO prepolymer is then reacted further with a primary or secondary monoamine containing at least one OH group to convert it to a hydroxy-functional polyurethane. Examples of monoamines which can be used are ethanolamine, N-methylethanolamine, diethanolamine, 3-amino-1-propanol and 2-amino-2-hydroxymethylpropane-1,3-diol.

In a further preferred method, the prepolymer containing terminal NCO is prepared as above. However, instead of capping the isocyanate groups with a monoamine, the prepolymer containing terminal NCO is chain-lengthened using an OH-containing polyamine, e.g. N-hydroxyethylethylenediamine. Using a sufficient quantity of this chain-lengthening agent to give an NCO/OH ratio of about 1.0, a chain-lengthened hydroxy-functional polyurethane is obtained which contains lateral OH groups.

All processes for the preparation of polyurethanes containing OH groups can be carried out as single-stage or multistage processes.

This procedure is described in, for example, EP-A-0 469 389. The preparation processes for polyurethane diols mentioned in this reference can be used, for example, for the preparation of component A) employed according to the invention.

The polyurethane resin of component A), containing hydroxyl groups preferably has a content of urethane groups (—NHCOO—) and optionally urea groups (—NHCONH—) of between 10 and 300 milliequivalents per 100 g of solid resin.

The polyurethane resin obtained by reacting components A) and B) contains radicals bonded via ester functions and carrying electron attracting CH-"acidic" groups. The following formula represents an example of such a resin.

$$P+O-C(=O)-CH(R^1)-R_2)_n \quad (I)$$

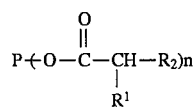

where $R^1$=H, $C_1$-$C_6$-alkyl, —$COOR^3$ $R^2$=—CN, —$COOR^3$, —$CONR_2^3$,

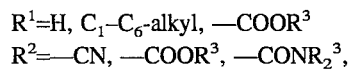

$$-\overset{NR^3}{\underset{\|}{C}}-R^3$$

$COR^3$

$R^3$=H, linear or branched $C_1$-$C_8$-alkyl

P=polyrurethane/polyurea polymer n=2 to 5 (=number of ester functions present on the structure P which contain CH-acidic groups).

The preparation of the aqueous polyurethane dispersion can be carried out without organic solvents at any stage.

The compounds employed as component a) to prepare the polyurethane resin A) starting material may be, for example, a linear or branched polyol component, e.g. diols. Starting from a linear diol component, polyols having a functionality >3 can be added to achieve branching in the polymer. The amount of these polyols should be chosen such that no gelling occurs during the synthesis.

Possible examples of the polyol component a) are polyether polyols of the general formula II:

$$H+O-(CHR^4)OH \quad (II)$$

in which $R^4$=hydrogen or a lower alkyl radical, optionally with various substituents, n=2 to 6 and m=10 to 50 or is even higher, the radicals $R^4$ being identical or different, Examples are poly (oxytetramethylene) glycols, poly (oxyethylene) glycols and poly (oxypropylene) glycols of mixed block copolymers containing different oxytetramethylene, oxyethylene and/or oxypropylene units.

It is preferable to use those polyether polyols having a molecular weight in the range from 400 to 3,000 which are obtained without the use of ethylene oxide, that is, in particular, exclusively using propylene oxide or tetrahydrofuran. The OH number is preferably between 10 and 150.

Further possible examples of the polyol component a) are polyester polyols. The polyester polyols can be prepared by, for example, esterification of organic dicarboxylic acids or their anthydrides with organic polyols. The dicarboxylic acids and the polyols may be aliphatic or aromatic dicarboxylic acids and polyols.

The low molecular polyols used to prepare the polyesters are, for example, diols such as alkylene glycols, for example ethylene glycol, butylene glycol, hexanediol, hydrogenated bisphenol A and 2-butyl-2-ethylpropanediol, neopentyl glycol and/or other glycols such as dimethylolcyclohexane. It is however also possible to employ higher-functional or mixtures of higher- and monofunctional OH components for example trimethylolpropane, pentaerythritol, glycerol and hexanetriol, polyethers which are condensation products of glycols with alkylene oxides, and monoethers of such glycols, such as diethylene glycol monoethyl ether and tripropylene glycol monomethyl ether.

The acid component of the polyester preferably comprises low molecular,weight dicarboxylic acids or their anhydrides, containing 2 to 18 carbon atoms in the molecule.

Examples of suitable acids are phthalic acid, isophthalic acid, terephthalic acid, tetrahydrophthalic acid, hexahydrophthalic acid, adipic acid, azelaic acid, sebacic acid, fumaric acid, maleic acid, glutaric acid, succinic acid, itaconic acid and/or 1,4-cyclohexanedicarboxylic acid. Instead of these acids it is also possible to use, where they exist, their methyl esters or anhydrides. It is also possible in order to obtain branched polyesters, to add higher-functional carboxylic acids, for example trifunctional carboxylic acids, trimellitic acid, malic acid, aconitic acid, bishydroxyethyltaurine and dimethylolpropionic acid, dimethylolbutyric acid or bisanhydrides polycarboxylic acids which can not form cyclic anhydrides are preferred.

The polyesters preferably have a molecular weight of from 300 to 6,000, an OH number of from 20 to 400 and an acid number of less than 3 and preferably less than 1. It is preferred to employ linear polyesters.

It is also possible for example to employ as component a) polycarbonate diols, as described in, for example, EP-A-0 427 979. These are esters of carbonic acid which are obtained by reacting carbonic acid derivatives, for example diphenyl carbonate or phosgene, with diols. Examples of suitable such diols are ethylene glycol, propane-1,2-diol and propane-1,3-diol, butane-1,4-diol and butane-1,3-diol, hexane-1,6-diol, octane-1,8 -diol, neopentyl glycol, 1,4-bishydroxymethylcyclohexane, 2 -methyl -1,3-propanediol, 2,2, 4-trimethylpentane-1,3-diol, and also diethylene glycol, polypropylene glycol, dibutylene glycol, polybutylene glycols, bisphenol A and/or tetrabromobisphenol.

Furthermore, polyester polyols, preferably diols derived from lactones, can be-used as component a) in the invention. These products are obtained, for example, by the reaction of an ε-caprolactone with a diol. Examples of such products are described in U.S. Pat. No. 3,169,945. The polylactonepolyols obtained by this reaction are characterized by the presence of a terminal hydroxyl group and by recurring polyester units which are derived from the lactone. These recurring parts of the molecule may correspond to the general formula $$-\overset{O}{\underset{\|}{C}}-(CHR^5)_n-CH_2O- \quad (III)$$

in which n is preferably from 4 to 6 and the substituent $R^5$ is hydrogen, an alkyl radical, a cycloalkyl radical or an alkoxy radical, with no substituent containing more than 12 carbon atoms and the total number of carbon atoms in the substituent in the lactone ring not exceeding 12.

The lactone used as starting material can be any desired lactone or any desired combination of lactones, such a lactone preferably containing at least 6 carbon atoms in the ring, for example from 6 to 8 carbon atoms and at least 2 hydrogen substituents should be present on the carbon atom attached to the ring oxygen group. The lactone used as starting material may be represented by the following general formula IV:

in which n and $R^5$ have the meaning already given.

The lactones preferred in the invention, for the preparation of the polyester diols, are the ε-caprolactones in which n has the value 4. The most preferred lactone is unsubstituted ε-caprolactone, in which n has the value 4 and all the $R^5$ substituents are hydrogen. This lactone is particularly preferred since it is available in large amounts and gives coatings having excellent properties. In addition, it is possible to use various Other lactones, individually or in combination.

Examples of aliphatic diols which are suitable for reaction with the lactone include ethylene glycol, 1,3-propanediol, 1,4-butanediol and/or dimethylolcyclohexane.

Examples of the isocyanate-reactive compound which can be employed as component a) for preparing the polyurethane resin A), which can be used as starting material for component I, are polythioethers containing OH groups and/or SH groups, such as condensation products of thiodiglycol with itself and/or with other glycols, dicarboxylic acids, hxdroxycarboxylic acids, formaldehyde, aminocarboxylic acids or aminoalcohols. The products are either mixed polythioethers, polythioether esters or polythioether ester amides.

Polyacetals containing OH groups, for example from the abovementioned polyols, in particular diethylene glycol, triethylene glycol, 4,4'-dioxy-ethoxy-diphenyl dimethylene, 1,6-hexanediol and formaldehyde. Suitable polyacetals can also be obtained by polymerization of cyclic acetals.

polyether esters containing groups which are reactive with isocyanate.

Polyamides and polyester amides containing OH groups, including preferably linear condensation products of polyfunctional saturated and unsaturated carboxylic acids or their anhydrides and polyfunctional saturated and unsaturated amino alcohols, diamines, polyamines or mixtures thereof.

Dihydroxypolyester carbonates

Polyurethanediols which can be prepared, for example, either from appropriate carbonates and diamines or, as is usual, from appropriate polyols and polyisocyanates.

Poly (meth)acrylatepolyols, in particular poly (meth) acrylatediols.

Polybutadiene oil diols.

These types of compound can be employed alone or in a mixture of two or more thereof. It is also possible to employ compounds which correspond to more than one of such types (intramolecular mixtures).

The low molecular weight compounds which can optionally also be used in a) are in particular alcohols and amines. These are the compounds, known per se from polyurethane chemistry, which are in terms of an isocyahate addition reaction at least difunctional, contain hydroxyl and/or amino groups and have a molecular weight of below 600 and preferably below 300. Suitable compounds are not only difunctional compounds in terms of the isocyanate addition reaction but also at least tri-functional compounds and any desired mixtures of such compounds.

Examples of such components are low molecular weight polyhydric alcohols such as ethylene glycol, propane-1,2-diol and propane 1,3-diol, butane-1,4-diol and butane-1,3-diol, hexane -1,6-diol, octane-1,8-diol, neopentyl glycol, 1,4-bishydroxymethylcyclohexane, 2-methyl-1,3-propanediol, 2,2,4-trimethylpentane-1,3-diol, glycerol, trimethylolpropane, trimethylolethane, isomeric hexanetriols and pentaerythritol; low molecular weight amines such as ethylenediamine, 1,2- and 1,3-diaminopropane, 1,3-, 1,4- and 1,6-diaminohexane, 1,3-diamino-2,2-dimethylpropane, isophoronediamine, 4,4'-diaminodicyclohexylmethane, 1,4-bis(2-aminopropyl)cyclohexane, or else hydrazinc, hydrazides and any desired mixtures of such amines or hydrazines; higher-functional polyamines such as diethylenetriamine, triethylenetriamine, dipropylenetriamine, tripropylenetetramine, cycloaliphatic diamines or addition compounds of acrylonitrile with diamines, such as hexamethylene-propylenetriamine, tetramethylenepropylenetriamine, isophoronepropylenetriamine, 1,4- or 1,3-cyclohexane-propylenetriamine or any desired mixtures of such polyamines, and the hydrogenated derivatives of such addition compounds.

As component b) for the preparation of the polyurethane dispersions it is possible to employ any desired organic polyisocyanates, for example diisocyanates. It is possible to employ aliphatic or aromatic isocyanates, including sterically hindered isocyanates. Examples of suitable diisocyanates are trimethylene diisocyanate, tetramethylene diisocyanate, pentamethylene diisocyanate, hexamethylene diisocyanate, propylene diisocyanate, ethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 1-isocyanatomethyl- 5-isocyanato-1,3,3-trimethylcyclohexane, bis-(4-isocyanatocyclohexyl)-methane, bis (4-isocyanatophenyl)methane, 4,4-diisocyanatodiphenyl ether, 1,5-dibutylpentamethylene diisocyanate, tetramethylxylylene diisocyanate, 2,3-bis(8-isocyanatatooctyl)-4-Octyl-5-hexyl-cyclohexane, 3(4)-isocyanatomethyl-1-methylcyclohexyl-isocyanate and/or 2,6-diisocyanatmethyl-capronate.

It is preferred to employ non-yellowing and/or sterically hindered isocyanates containing from 4 to 25 and preferably from 6–16 carbon atoms, which contain in the alpha-position to the NCO group one or two linear, branched or cyclic alkyl groups having from 1 to 12 and preferably from 1 to 4 carbon atoms. The basic structure can comprise an aromatic or alicyclic ring or an aliphatic linear or branched carbon chain containing from 1 to 12 carbon atoms. Examples of such compounds are isophorone diisocyanate, bis (4-isocyanatocyclohexyl)-methane, 1,1,6,6-tetramethyl-hexamethylene diisocyanate, 1,5-dibutylpentamethylene diisocyanate, 3(4)-isocyanatomethyl-1-methyl-cyclohexyl-isocyanate, p- and m-tetra-methylxylylene diisocyanate and/or the corresponding hydrogenated homologues.

If desired, it is also possible to add small proportions of higher-functional isocyanates such as polyisocyanates of the biuret or isocyanurate type, or products obtained by reacting an excess of diisocyanate with polyols. However, this procedure is not preferred.

In accordance with the invention the low molecular weight compounds preferably used as component c) are those which contain more than one, preferably two or at least two groups which react with isocyanate groups, and at least one ionic group, group capable of ion formation, and/or hydrophilic group. Anionic or anion-forming groups are preferred. Suitable groups which react with isocyahate groups are in particular hydroxyl groups and primary and secondary amino groups. Suitable acidic groups capable of ion formation are carboxy, phosphoric acid and sulphonic acid groups. Basic groups which can be converted to cations include, for example, primary, secondary and tertiary amino groups or onium groups, such as quaternary ammonium, phosphonium and/or tertiary sulphonium groups. The anionic groups which are preferably to be introduced in accordance with the invention are carboxyl groups; they can be introduced, for example, by using hydroxyalkanecarboxylic acids of the following general formula as component c):

$$(HO)_x\text{-}Q(COOH)_y$$

in which

Q is a straight or branched hydrocarbon radical having 1 to 12 carbon atoms and x and y are each 1 to 3. Examples of such compounds are citric acid and tartaric acid. Preferred carboxylic acids are those in which x=2 and y=1. Examples of these compounds are described in U.S. Pat. No. 3 412 054. A preferred group of dihydroxyalkanoic acids are α,α-dimethylalkanoic acids of the general formula $$\begin{array}{c} CH_2OH \\ | \\ Q'\text{---}C\text{---}COOH \\ | \\ CH_2OH \end{array}$$

in which Q' is hydrogen or $C_{1-8}$-alkyl. The most preferred compound is α, α-dimethylolpropionic and butyric acid.

Further examples of dihydroxyalkanoic acids which can be used are dihydroxypropionic acid, dimethylolacetic acid, dimethylolbutyric acid, dihydroxysuccinic acid or dihydroxybenzoic acid. Also suitable are the polyhydroxy acids which can be obtained by oxidation of monosaccharides, for example gluconic acid, saccharic acid, mucic acid and glucuronic acid.

Examples of compounds containing amino groups are α, α-diaminovaleric acid, 3,4-diaminobenzoic acid, 2,4-diaminotoluene-5-sulphonic acid and 4,4-diaminodiphenyl ether-sulphonic acid.

Acidic polyesters as described in DE-A-39 03 804 can also be employed as component c) according to the invention. These polyesters can be prepared by methods known to those skilled in the art, as described in, for example, Wagner, Sarx; 5th edition; Lackkunstharze; [synthetic coating resins]; Karl-Hanser Verlag; pp. 86–99. The usual raw materials can be employed for preparing the polyesters.

Examples of these are the raw materials mentioned for the preparation of the polyesters described under a). It is expedient additionally to use a proportion of tri-and/or higher-functional components. Trifunctional components which can be used are triols, tricarboxylic acids, bisanhydrides, hydroxycarboxylic acids and dihydroxysulphonic acids. Tricarboxylic acids and dihydroxycarboxylic acids are preferred. These polyesters preferably have a molecular weight of from 300 to 2,000, a hydroxyl number of from 56 to 374 and an acid number of from 28 to 187.

Component c) may also comprise nonionic hydrophilic polyols. Examples of these are compounds which contain polyether chains with incorporated ethylene oxide units. They are compounds containing one or two hydrogen atoms reactive towards isocyanates and which carry, for example in the side chain, polyether chains containing ethylene oxide, or are mixtures thereof. Examples include compounds of the general formulae $$\begin{array}{cc} R^3 & R^3 \\ | & | \\ HO\text{---}CH\text{---}CH_2\text{---}N\text{---}CH_2\text{---}CH\text{---}OH \\ & | \\ & CO\text{---}NH\text{---}R\text{---}NH\text{---}CO\text{---}O\text{---}X\text{---}Y\text{---}R^6 \end{array} \quad (V)$$

$$HO\text{---}X\text{---}Y\text{---}R^6 \quad (VI)$$

$$HNR^3\text{---}X\text{---}Y\text{---}R^6 \quad (VII)$$

in which

R=the radical resulting from an isocyanate component, for example from isocyanates as mentioned above, $R^3$=is as defined above, $R^6$=$C_{1-12}$-alkyl, preferably unsubstituted $C_{1-4}$-alkyl, X=a radical as obtained by removing the terminal oxygen atom from a polyalkylene oxide chain containing 5 to 90 and preferably 20 to 70 chain members, the chain members consisting to the extent of at least 40% and preferably 65% of ethylene oxide units, and which may, in addition to ethylene oxide units, also represent propylene oxide, butylene oxide or styrene oxide units. Among the latter units propylene oxide units are preferred.

Y=—O— or —$NR^6$—, where $R^6$ is as defined above. The preparation of compounds V to VII can be carried out, for example, in analogy to U.S. Pat. No. 3,920,598, U.S. Pat. No. 3,905,929, U.S. Pat. No. 4 190 566 or U.S. Pat. No. 4,237,264.

The anionic, cationic or nonionic groups of component c) serve to stabilize the aqueous dispersion. Ionic and nonionic groups can be used together. Stabilization by ionic groups is preferred.

To prepare an anionic urethane prepolymer, the dihydroxycarboxylic acids are preferred. Dimethylolpropionic acid is particularly preferred. Component c) is preferably used in an amount of about 0.4 to about 7.5% by weight, particularly preferably about 0.8 to 5.0% by weight (calculated as carboxyl group COOH), based on the urethane prepolymer according to the invention (solid resin). When the quantity of carboxyl groups is below about 0.4%, it is difficult to prepare a stable emulsion. If, on the other hand, the quantity exceeds 7.5% by weight, the hydrophilic character of the emulsion increases, making it highly viscous and reducing the water-resistance of the coating.

The amounts of a), b) and c) are chosen such that the product which results from the reaction contains terminal, preferably primary OH groups, i.e. an excess of polyol is used. It is possible to use a ratio of OH to NCO of more than 1 to 4:1; the range is preferably from 1.1 to 2 :1 and particularly preferably from 1.1 to 1.7 :1. Preferred polyurethanes contain less than 280 milliequivalents of —NH-COO— per 100 g of solid resin. The reaction product may be of branched construction, but is in general preferably of linear construction.

The hydroxy-functional reaction product of a), b) and c) is converted with component B) into a polyurethane resin that contains CH-acidic groups. In this way, CH-acidic groups are incorporated into the polyurethane.

Depending on the choice of component B), the products formed may contain, for example, the following preferably terminal groups:

$$\begin{array}{c} O \quad\quad O \\ \| \quad\quad \| \\ -O-C-CHR^1-C-CH_3 \end{array} \quad (VIII)$$

$$\begin{array}{c} O \quad\quad O \\ \| \quad\quad \| \\ -O-C-CHR^1-C-OR^7 \end{array} \quad (IX)$$

$$-O-C(=O)-CHR^1-CN \quad (X)$$

$$-O-C(=O)-CHR^1-C(=O)-NR_2^7 \quad (XI)$$

in which $R^1$ is as defined above for the general formula (I) and $R^7=C_1-C_8$-alkyl, linear or branched.

Given a suitable choice of the quantities of starting components, it is also possible, using poly-β-keto esters having an ester functionality of greater than or equal to 2 as component B, to incorporate CH-acidic groups into the polyurethane main chain. This can be carried out, for example, using diesters of malonic acid and triesters of methanetricarboxylic acid. However, it is preferred to use resins which contain CH-acidic groups at the chain ends or on side chains.

The synthesis can be carried out by a variety of methods known from the literature. For instance, the OH groups of the intermediate of component A) can be attached via a C—O bond directly to a carbonyl centre. Examples of such syntheses are the following reactions:

1. The reaction of carboxylic acids with CH-acidic groups and alcohols with the addition of conventional esterification catalysts or esterification auxiliaries, which can activate acids and, in contrast to catlysts, will undergo a change for example dicyclohexylcarbodiimide.

2. The reaction of activated carboxylic acid derivatives, such as carboxylic acid esters, carboxylic halides or carboxylic anhydrides, with alcohols, for example the transesterification reaction

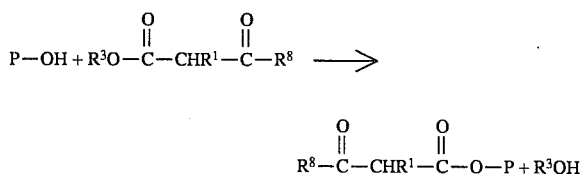

where P=polymer, $R^1$ and $R^3$ are as defined above and $R^8$=—$CH_3$ or —$OR^7$, and $R^7$ is as defined above.

3. The reaction of alcohols with diketenes

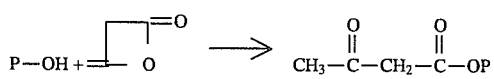

4. Reactions of alcohols with diketene adducts

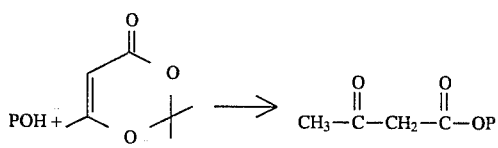

A descriptive overview is given in J. S. Witzemann, JOT 62 (1990), 101.

Reagents suitable as component B) for such functionalizations are consequently, for example, carboxylic acids containing CH-acidic groups, their activated derivatives such as esters, halides (e.g.) chlorides) and anhydrides, diketenes and diketene adducts, for example: acetoacetic acid; aliphatic β-keto esters whose alcohol components are volatile, such as methyl, ethyl and tert-butyl acetoacetate; β-keto-carboxylic acids such as acetoacetic acid; diketene and diketene adducts, such as 2,2,6-trimethyl-4H-dioxin-4-one; methanetricarboxylic acid esters, such as trimethyl or triethyl methanetricarboxylate; aliphatic cyano acetic acid esters, such as methyl, ethyl or butyl cyanoacetate. As described above, it may be favourable to react components A and B in the presence of alcohols and optionally of esterification auxiliaries.

The acetoacetic ester derivatives of the polymeric polyols can optionally also be reacted with primary or secondary amines, as described in DE-A-39 32 517, to give enamines. In this way the CH-acidity can be increased.

The polyurethane resin obtained from A) and B) may contain groups which can be converted to ions, all or some of which groups can be converted to the corresponding salts.

Where the polyurethane resin contains anion-forming groups, these can then be converted by process step C) into anions. In this case a tertiary amine is preferably used for C). Examples of suitable tertiary amines are trialkylamines, such as trimethylamine, triethylamine, triisopropylamine, tri-n-propylamine and tri-n-butylamine, N-alkylmorpholines, such as N-methyl-morpholine and N-ethylmorpholine, N-dialkylalkanol amines, such as N-dimethylethanolamine, N-diethylethanolamine and N-dimethylisopropanolamine, and mixtures of two or more of these compounds.

Where the polyurethane-resin contains cation-forming groups, then an acid is preferably used for C). Examples of suitable acids are phosphoric acid or acidic phosphoric acid esters, boric acid or organic carboxylic acids such as formic acid, acetic acid, propionic acid and acrylic acid, dihydroxycarboxylic acids such as lactic acid, dimethylolpropionic acid or citric acid, or dicarboxylic acids such as malonic acid, glutaric acid or oxalic acid. It is also possible to employ mixtures of these acids. However, a quarternization reaction with alkylating agents, for example the reaction with alkyl halides or epoxides, is also possible.

The polyurethane resin carrying hydrophilic groups can be transferred to the aqueous phase before or after chain-linking, and gives a fine polyurethane dispersion having an average particle size of greater than 10 and less than 2,000 nm, preferably more than 50 and less than 500 nm. The system can be bimodal and preferably monomodal.

In general, it is unnecessary to use emulsifiers to convert the polyurethane resins used in accordance with the invention to aqueous dispersions. However, this does not exclude the possible addition of emulsifiers of ionic and nonionic type in order to facilitate emulsification.

The polyurethane dispersions according to the invention which are prepared by reacting components A) and B) and then transferring to water can be used as such for the formulation of aqueous coating compositions.

The polyurethane resins obtainable from components A) and B) as described above can also be subjected, using the CH-acidic groups, to a chain-lengthening operation. This chain-lengthening can be carried out before or after the transfer to the aqueous phase.

A preferred procedure is to transfer the polyurethane resin of A) and B) to the aqueous phase and then to react at least some of the CH-acidic groups introduced with B) using suitable chain-lengthening agents (component D)). In this case the quantitative ratios of the reaction components are selected as a function of the molecular mass and the content of CH-acidic groups.

As mentioned above, the chain-lengthening according to the invention using component D) may also be carried out using a polyurethane resin dispersion as described in, for example, EP-A-0 367 051. In this case at least one organic polyisocyanate is reacted with at least one compound containing more than one group which is reactive with isocyanate and at least one ionic group, group capable of ion formation and/or hydrophilic group, with at least one mono- and/or polyalcohol which contains a CH-acidic group and optionally with one or more chain-lengthening agents and optionally with one or more polyalcohols.

The polyurethanes can also contain urea groups, either if primary or secondary amines are used or if an NCO excess is employed followed by dispersion in water. The resulting polyurethanes may, for example, be dispersed in water in the presence of bases such as ammonia or organic amines. However, it is also possible to react any polyurethanes or polyurea resins obtained by other processes with the reaction product of A and B.

Compounds (component D) suitable for chain-lengthening according to the invention are those which react with CH-acidic centres. They must provide the possibility for at least two reactions.

Examples of compounds suitable for this purpose are:
1. Aromatic, araliphatic, aliphatic or cycloaliphatic mono- and polyaldehydes which may be present as monomers or polymers, preferably aliphatic or cycloaliphatic aldehydes having a low degree of steric hindrance and molecular weights of from 30 to 500 and preferably from 30–300, such as formaldehyde, acetaldehyde, glyoxal, glutaraldehyde, paraformaldehyde, propionaldehyde, butyraldehyde, isobutyraldehyde, 2-methylpentenal, furfural or acrolein.
2. Aromatic, aliphatic or cycloaliphatic polyisocyanates which are conventional in the chemistry of coatings. In addition to the diisocyanates already listed as examples under b), it is also possible to employ NCO-containing prepolymers or higher-functional isocyanates (having an NCO functionality of >2). These are, for example, isocyanates of the biuret or isocyanurate type, but also products obtained using an excess of diisocyanates by reaction with polyols. The polyols concerned may be either of low or high molecular weight. Examples of such polyisocyanates are the adduct of 3 mol .of isophorone diisocyanate with trimethylolpropane, or polyfunctional NCO-containing prepolymers. The prepolymers should also be understood as including, preferably, water-emulsifiable prepolymers which may be stabilized by ionic and/or nonionic hydrophilic groups. NCO prepolymers stabilized by anions are described in, for example, EP-A-0 089 497 as a reaction product prior to chain-lengthening in the water phase.

A further group of suitable aliphatic polyisocyanates can be prepared, for example, by selective reaction of silylated polyalcohols with isocyanatocarboxylic acid chlorides. Examples of such ester group-containing polyisocyanates are those based on hexane diisocyanate and pentaerythritol.

The chain-lengthening reagents which are suitable can be employed individually or in combination.

The chain-lengthening can also be carried out, at least partially, even before the transfer to the aqueous phase, but is preferably carried out in the aqueous dispersion. For this purpose it is advantageous if D) has good emulsifiability in the dispersion phase. This can be assisted, for example, by hydrophilic groups in D). To accelerate the reaction, the mixture can optionally be heated to slightly elevated temperatures.

The chain-lengthening can optionally be carried out in the presence of one or more low molecular weight compounds, having a molecular weight of <1,000, which also contain CH-acidic groups. They have a functionality of ≧2, preferably of between 3 and 5, and can thus lead to branching. They are designated below as component E).

The CH-acidic compounds employed as component E) are those containing at least two CH-acidic hydrogen atoms which may, for example, come from one or more of the following groups, which may be identical or different:

where h1 is selected from

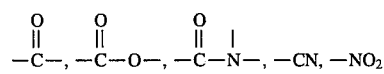

where h2 is selected from

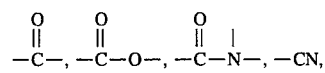

and where h3 is selected from

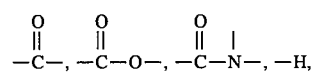

alkyl, alkylene, the carboxyl or carboxamide groups defined by the above radicals h1, h2 and h3 being attached in each case via the carbon atom to the CH group, and the CH group being attached to an oligomer unit optionally via at least one of the radicals h1, h2 and/or h3. The CH-acidic functionality of component E) is on average greater than or equal to 2 per molecule. If h3 in the general formula has the meaning of a hydrogen atom, then a group of this kind may be adequate since it contains two acidic hydrogen atoms. The CH-acidic functionality of E) is on average greater than or equal to 2, i.e. monofunctional compounds can also be employed in a mixture with higher-functional molecules.

Examples of compounds having a functionality of >2 and an average molecular weight of less than 1,000 are acetoacetic acid derivatives, for example esters or amides. Esters are obtained by, for example, reacting polyols, for example trimethylolpropane, pentaerythritol or oligo esters having a functionality of >2 with CH-acidic carboxylic acids or derivatives thereof, diketene or diketene adducts. Corresponding amides are obtained by, for example, reacting polyamines having a functionality of more than 2 with CH-acidic carboxylic acids or derivatives thereof, diketene or diketene adducts. The reaction of components A) to E) with one another is preferably carried out without solvent, preferably stepwise by the known processes of organic chemistry. For example, the polyol component a), the isocyanate b) and the component c) which is polyfunctional with regard to isocyanate groups are first of all reacted with one another in the absence of solvent. In this context, components a) and b) can first be reacted with one another and further reaction carried out with c), or all the components can be reacted at the same time. The resulting OH-containing reaction product is reacted further in the absence of solvent with B) to give a functionalized urethane-urea.

The reaction may preferably be carried out in the absence of solvent but may also be carried out in solvents suitable for polyurethane synthesis and familiar per se to those skilled in the art. In this case it is advantageous to distil off the solvents, optionally in vacuum, prior to further processing. The distillation can be carried out at any stage in the process. Small quantities of residual solvent do not impair the finished dispersion.

The CH-acid-functionalized polyurethane resin may, after transfer to the aqueous phase in accordance with the process step C), be chain-lengthened using component D). Chain-lengthening is optionally carried out in the presence of component E.) D) and/or E) should be mixed homogeneously with the CH-acidic-functionalized polyurethane resin. This can be carried out before or after the salt formation in the organic phase, or before or after the dilution with water. The chain-lengthening reaction takes place preferably in the aqueous dispersion.

In the preparation of the polyurethane resin dispersion according to the invention, the individual components A), B) and optionally D) and E), and a), b) and c), are reacted with one another in amounts such that binder properties desired by those skilled in the art are obtained, such as water-dispersibility, viscosity behaviour and film-forming properties. By selecting the nature and amount of the components, it is also possible to influence properties such as hardness and weather-resistance of the coatings obtained from the dispersions. The selection of the nature and amount of the components can easily be carried out by those skilled in the art on the basis of the teaching indicated here, on the basis of routine experiments if desired.

The preparation of the aqueous dispersion of the resin, whether chain-lengthened or not, can be carried out by known processes. For example, it is possible initially to take the neutralized resins and to add water to them with thorough dispersion. It is also possible initially to take the water phase, containing neutralizing agents if desired, and to incorporate the resin with stirring. A continuous mode of operation is also possible, i.e. the resin, water and neutralizing agent are simultaneously mixed together homogeneously in known apparatus, for example a rotor-stator mixer. The transfer to the aqueous phase can be assisted by increasing the temperature.

The pH of the resulting polyurethane dispersion is controlled and may for example, be adjusted to a value between 6 and 8. The components form a fine opague or turbid polyurethane dispersion.

The anionic polyurethane dispersions according to the invention, or used in accordance with the invention, have an acid number of from 5 to 90 (based on the solids), preferably more than 10 and less than 50. The solids content is between 25 and 65% by weight, preferably more than 35 and less than 60% by weight. The number-average molecular mass (Mn) of the polyurethane resins contained in the polyurethane dispersions according to the invention, or those used in accordance with the invention, is for example from 2,500 to 1,000,000, the lower limit preferably being at 5,000 and particularly preferably at 20,000 and the upper limit being preferably at up to 500,000.

Using the PU dispersions according to the invention, whether chain-lengthened or not, it is possible to prepare aqueous low-solvent coating compositions, preferably basecoat compositions. For this purpose, the PU dispersion is admixed, for example, with pigments, further binders, additives and optionally with small amounts of solvents.

The polyurethane component I of the coating agents of the invention can contain one or more further binders. Examples for such binders are usual film forming water dilutable polyester resins, water dilutable polyacrylate resins and different water-dilutable polyurethane resins. They can be reactive or non-functional. They can amount from 0 to 95 % by weight of the total resins weight in component I. The preferred amount is 0 to 80, particularly 0 to 60% by weight.

Specification and amounts of additional binders are chosen in such a way that preferably a mixture is obtained having an average amount of ionic groups, groups convertible into ionic groups and/or hydrophilic groups corresponding to 5 to 200 meq per 100 g resin solids.

If desired the additional binder can be precondensed with the polyurethane resins of component I at elevated temperatures.

Examples of water-dilutable polyesters are those containing free carboxyl groups, i.e. polyesters with a high acid number. Two basic methods are known of incorporating the required carboxyl groups into the resin system. The first consists in terminating the esterification at the desired acid number. With this method insertion of sterically hindered carboxylic groups is preferred, e.g. by condensation with dimethylol proprionic acid. After neutralization with bases the resulting polyesters are soluble in water. The second possibility consists in the formation of partial esters of di-or polycarboxylic acids with hydroxyl-rich polyesters of low acid number. For this reaction it is usual to employ arthydrides of the dicarboxylic acids, which under mild conditions are reacted with the hydroxyl component, forming a free carboxyl group.

The water-dilutable polyacrylate resins, just like the polyester resins described above, may contain free carboxyl groups. There resins are generally acrylic or methacrylic copolymers and the carboxyl groups are derived from the acrylic or methacrylic acid units.

The additional polyurethane dispersions should be understood as including, for example, those described in DE-A-36 28 125. These are anionically stabilized PU dispersions which are formed by reacting polyols, diisocyanates and ionic compounds and chain-lengthening with amines. It is also possible to add PU dispersions stabilized by nonionic hydrophilic groups to the coating compositions according to the invention. The water dilutable polyester and polyurethane resins can be acrylated or grafted by suitable polymerisation reaction in dispersions. Examples for acrylated PU-dispersions are described in DE-A-4122265.

A further group of aqueous dispersions which can be added to the coating compositions according to the invention are the dispersions described in DE-A-36 28 124, based on ionic, epoxide group-containing polycondensation products which are reacted with copolymerizable unsaturated monomers.

When adding further binders, it goes without saying that additional ionically stabilized resins anti dispersions can only be used together with ionic dispersions according to the invention which carry the same charge, so as not to impair the stability.

In preparing the coating compositions according to the invention it is possible to use various crosslinking agents, such as, for example, formaldehyde condensation resins, such as phenol-formaldehyde condensation resins andamine-formaldehyde condensation resins, and blocked polyisocyanates. The crosslinking agents may be used individually or in a mixture. The mixing ratio of crosslinking agent to polyurethane resin is preferably from 10:90 to 80:20 and particularly preferably from 20:80 to 70:30, in each case based on the weight of solids.

Amine resins Which are suitable as crosslinking agents include, for example, alkylated condensation products prepared by reacting aminotriazines and amidotriazines with aldehydes. Using known industrial processes, amines, or compounds-which carry amino groups, such as melamine, guanamine, acetoguanamine, benzoguanamine, dicyandiamide or urea undergo condensation teactions, in the presence of alcohols such as methanol, ethanol, propanol, butanol or hexanol, with aldehydes, in particular formaldehyde. The reactivity of such amine resins is determined by the degree of condensation, the ratio of the amine or amide components to formaldehyde and the nature of the etherification alcohol used. Examples of such resins and their preparation are described in "Houben-Weyl, Methoden der organischen Chemie" "[Methods of Organic Chemistry]" 1963, page 357. These products are readily available commercially.

It is also possible to use blocked polyisocyanates as crosslinking agents. Any desired polyisocyanates can be used for the invention, in which the isocyanate groups have been reacted with a compound so that the blocked polyisocyanate formed is resistant at room temperature to hydroxyl groups and water, but is reactive at elevated temperatures, generally in the range from about 90° to about 300° C. In the preparation of the blocked polyisocyanates, any desired organic polyisocyanates suitable for crosslinking can be used. Preferred isocyanates are those containing about 3 to about 36 and in particular about 8 to 15 carbon atoms. Examples of suitable diisocyanates are the diisocyanates mentioned above as component b).

It is preferred to use polyisocyanates of higher isocyanate functionality, such as those mentioned above under b) and D). Examples of these are tris(4-isocyanatophenyl)methane, 1,3,5-triisocyanatobenzene, 2,4,6-triisocyanatotoluene, 1,3, 5- tris (6-isocyanatohexyl) biuret, bis(2,5-diisocyanato-4-methylphenyl) methane and polymeric polyisocyanates, such as dimers and trimers of diisocyanatotoluene. Mixtures of polyisocyanates can also be used.

The organic polyisocyanates which are suitable as crosslinking agents in the coating compositions according to the invention may also be prepolymers derived, for example, from a polyol, including a polyether polyol or a polyester polyol. As is known, for this purpose polyols are reacted with an excess of polyisocyanates to form prepolymers having terminal isocyanate groups. Examples of polyols which can be used for this purpose are simple polyols, for example glycols such as ethylene glycol and propylene glycol, and other polyols such as glycerol, trimethylolpropane, hexanetriol and pentaerythritol, and also monoethers such as diethylene glycol and tripropylene glycol, and polyethers which are condensation products of such polyols with alkylene oxides. Examples of alkylene oxides which are suitable for the condensation with these polyols to form polyethers are ethylene oxide, propylene oxide, butylene oxide and styrene oxide. These condensation products are designated in general as polyethers having terminal hydroxyl groups. They may be linear or branched. Examples of such polyethers are polyoxyethylene glycol with a molecular weight of 1,540, polyoxypropylene glycol with a molecular weight of 1,025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can also be used. Particularly suitable polyether polyols are those obtained by reacting such polyols, such as ethylene glycol, diethylene glycol, triethylene glycol, 1,4-butanediol, 1,3-butanediol, 1,6-hexanediol and mixtures thereof, and glycerol, trimethylolethane, trimethylolpropane, 1,2,6-hexanetriol, dipentaerythritol, tripentaerythritol, polypentaerythritol, methyl glucosides and sucrose with alkylene oxides, such as ethylene oxide, propylene oxide or mixtures thereof.

The blocked polyisocyanates which can be employed accordance with the invention as crosslinking agents may be blocked with conventional monovalent and volatile blocking agents as are employed in the chemistry of coatings. Examples of these are various alcohols, oximes, phenols, aminss, beta-keto compounds and phthalimide etc. The polyisocyanates can be blocked in one molecule by the same or different blocking agents. The crosslinking agents used may also be mixtures of differently blocked polyisocyanates, or else polyisocyanates containing different blocking groups in the molecule.

The blocking of the polyisocyanates may involve, for example, the use of any desired aliphatic, cycloaliphatic or aromatic alkyl monoalcohols which are suitable. Examples of these are aliphatic alcohols such as methyl, ethyl, chloroethyl, propyl, butyl, amyl, hexyl, heptyl, octyl, nonyl, 3,3,5-trimethylhexyl, decyl and lauryl alcohol, cycloaliphatic alcohols such as cyclopentanol and cyclohexanol, and aromatic alkyl alcohols such as phenylcarbinol and methylphenylcarbinol. It is also possible, optionlily, to use small proportions of monoalcohols of higher molecular weight and relatively low volatility, these alcohols acting as plasticizers in the coatings after their elimination.

Other suitable blocking agents are oximes such as methyl ethyl ketoxime, acetone oxime and cyclohexanone oxime, and also caprolactams, phenols, pyrazole derivates and hydroxamic acid esters. Preferred blocking agents are malonic esters, acetoacetic esters, β-diketenes and methyl ethyl ketoxime.

The blocked polyisocyanates are prepared by reacting a sufficient quantity of a blocking agent with the organic polyisocyanate, with the optional addition of catalysts, so that no further free isocyanate groups are present.

The coating compositions according to the invention may also contain polymer microparticles known to those skilled in the art. Crosslinked or uncrosslinked microparticles may be employed. Examples of such polymer microparticles are described in EP-A-0 038 127 and EP-A-0 234 362.

The coating compositions can also contain coating additives, for example agents which affect the theology, such as highly disperse silicic acid, phyllosilicates or polymeric urea compounds. Examples of other effective thickeners are water-soluble cellulose ethers, such as hydroxyethylcellulose, methylcellulose or carboxymethyl-cellulose, and/or synthetic polymers containing ionic groups and or groups having an associative effect, such as polyvinyl alcohol, poly (meth) acrylamide, poly (meth) acrylic acid, polyvinylpyrrolidone, styrene/maleic anhydride or ethylene/maleic anhydride copolymers and their derivatives, or else hydrophobically modified ethoxylated polyurethanes or polyacrylates. Besides these, antideposition agents, levelling agents, light stabilizers, antifoaming agents, for example silicone-containing compounds, wetting agents and adhesion promoters can be employed. Wetting agents are understood as including known paste resins, as described for example in DE-A-40 00 889, which can be employed for the better dispersion and grinding of the pigments. Catalysts can optionally be employed to accelerate curing, but curing is also possible using thermal energy, without the use of a catalyst.

Suitable solvents to be present in low amounts are conventional coating solvents, which may come from the preparation of the binders or be added separately. Examples of such solvents are mono- or polyhydric alcohols, for example propanol, butanol and hexanol, glycol ethers or esters, for example diethylene and dipropylene glycol di($C_{1-6}$)alkyl ethers, ethoxypropanol; butyl glycol, glycols such as ethylene glycol, propylene glycol and its oligomers, N-methylpyrrolidone, and ketones such as methyl ethyl ketone, acetone and cyclohexanone, aromatic or aliphatic hydrocarbons, for example toluene, xylene or $C_6$–$C_{12}$ linear or branched aliphatic hydrocarbons.

Via the number of solvents, influence may be exerted on the flow and viscosity of the coating composition. The evaporation characteristics can be influenced by the boiling point of the solvent mixture employed.

Examples of suitable pigments are inorganic and/or organic colour pigments and/or effect pigments such as, for example, metallic or pearlessent pigments. Examples of such pigments are those of copper or its alloys, aluminum or steel, or multilayer silicates coated with metal oxides. These can be used individually or in a mixture. Preference is given to the employment of aluminium pigments. The quantity is between 0.5 and 15% by weight based on the coating composition. If the PU dispersions are used as sole binders, the preferred metallic pigments are those commercially available metal powders which are specifically pretreated for aqueous systems. The metal powders can be employed together with one or more further nonmetallic pigments or dyes, for example microfine titanium dioxide or finely dispersed silicic acid.

Known organic or inorganic colour pigments can be employed as further pigments. Examples of colour pigments are vat dyes, quinacridones, perylenes and phthalocyanines. Examples of inorganic pigments are carbon black, titanium dioxide or iron oxide pigments, and transparent pigments such as micronized titanium dioxide and micronized barium sulphate or silicon dioxide. As an option, it is also possible to add extenders such as kaolin, mica, chalk, barium sulphate, silicic acids or ground quartz. Solid-colour basecoats are preferably prepared using these colour pigments.

The coating compositions according to the invention can be prepared by methods which are known per se. For example, the pigments and/or extenders can be dispersed in a proportion of the binder dispersion and can be grinded. In this case specific paste resins can also be employed. The viscosity cam be adjusted to a suitable value by adding water or, if desired, solvent. Grinding can be followed by the addition of the further coating components, for example a further PU dispersion, additional binders, crosslinking agents, agents affecting rheology, antifoams, anti-pitting agents, levelling agents, catalysts or solvents. The solids content and pH of the coating composition are adjusted if desired. Care should be taken that the components used are mutually compatible and produce a coating composition which is stable on storage.

The pH of the coating compositions is preferably from 6.5 to 8. The finished coating compositions generally have a solids content of from 10–45% by weight, and their viscosity (using the DIN 4 flowcup) is from 15 to 35 sec. Their water content is from 55–90% by weight and the content of organic solvents is from 0–20% by weight, preferably below 10% by weight and particularly preferably below 5% by weight, in each case based on the overall coating composition.

The solids content and the viscosity can be matched directly prior to use to the particular application conditions.

The binders are particularly suitable for the preparation of coating compositions for the colour imparting basecoats. However, it is also possible to use them to prepare other coating compositions, for example primers, fillers or stone-chip-resistance coats. In this context the selection of the pigments and additives and their concentration are adapted to the particular use intended.

The invention also relates to a process for the preparation of a multicoat finish, in which, for example, any primer or adhesion coat is applied to a substrate, optionally as the first coat. This coat can preferably be produced from water-thirinable coating compositions. A coloured basecoat is applied to this first coat using the coating composition according to the invention. This basecoat is either dried under hot conditions or the process is continued, after an optional brief flash-off time, by a wet-on-wet method. On top of the latter coat a clearcoat is applied. Suitable clearcoats are in principle all known coating compositions or those which do not contain transparent pigments. In this context it is possible to use conventional 1- or 2-component coatings containing solvent, or water-thinnable clearcoats, powder clearcoats or radiation-curable coatings. The basecoat and clearcoat layers are preferably applied by a wet-on-wet method.

After application the clearcoat and optionally the basecoat are preferably dried at elevated temperature. The drying conditions for the topcoat layer (basecoat and clearcoat) depend on the clearcoat system used. They may be at from 20° to 150° C. For refinishing purposes, for example, temperatures from 20° to 80° C. are preferred; for the purposes of OEM finishing the preferred temperatures are over 100° C., for example more than 10° C. The coating compositions of the invention can be formulated as one component or two component systems.

The invention also relates to a substrate coated with a multicoat finish which has been obtained by the application of at least one primer layer, based preferably on a water-thinnable coating composition, the application of a colour-imparting basecoat with a coating composition according to the invention, the optional drying of the basecoat and the application of a transparent coating composition as a topcoat, and the subsequent heating of the coated substrate. If desired, it is also possible to supplement this multicoat finish with additional coats.

The multicoat finish according to the invention has a good surface. The adhesion between the coats and the basecoat is good, and no delamination faults are evident even on exposure to a damp atmosphere. The invention is particularly suitable for use in automotive finishing (OEM finishing and refinishing).

Suitable substrates are metallic and plastics substrates. The substrates known in the automobile industry are particularly suitable, for example iron, zinc, aluminium, magnesium or alloys thereof, and polyurethanes, polycarbonates or polyolefins. The latter may if desired be coated with primers. The coating compositions according to the invention are, however, also outstandingly suitable for coating other substrates, in particular mineral substrates such as concrete and wood, and for coating sheets (plastics and paper sheets) and for producing thin coats for adhesively bonding two or more substrates.

The coating compositions formulated with the polyurethane resin dispersions according to the invention are distinguished by good storage stability. The water-dilutability of the dispersion is not a problem; the need for cosolvents is minimal. The coating compositions formulated in accordance with the invention exhibit excellent atomization characteristics on spray application. The production of multilayer coatings results in very good interlayer adhesion. In the formulation of metallic coatings, good metallic effects are obtained.

The invention is illustrated in more detail below on the basis of exemplary embodiments.

Polyurethane dispersion 1:

518 g of a polyester of hexanediol, neopentyl glycol, adipic acid and isophthalic acid, having a hydroxyl number of 130 and an acid number of below 3, and 54 g of dimethylolpropionic acid are dried for 1 h at 100° C. in vacuo. The polyester is then cooled to 80° C. and 178 g of isophorone diisocyanate are added at a rate such that the reaction temperature does not exceed 85° C. The reaction mixture is held at this temperature until no further free NCO groups can be detected. When this condition is reached the addition of 75 g of ethyl acetoacetate is commenced. After addition is complete, the temperature is raised over a period of 1 h to 140° C., and the mixture is held at this temperature until no further distillate is collected. In order to remove the residues of eliminated alcohol and unreacted ethyl acetoacetate, a vacuum is briefly applied. To disperse the acetoacetate-functionalized polyurethane in water, first of all 20.2 g of triethylamine are added, and stirred in thoroughly, and then a stable dispersion is produced of 1221 g of deionized water, giving a solids content of 40% by weight. For chain-lengthening, 17 g of formaldehyde solution (37% by weight) are added and stirring is continued for 2 h.

| Analytical characteristics: | |
|---|---|
| Acid No. (mg of KOH/g) | 29 |
| pH value | 7.2 |
| Stoving residue | 39.6% |
| (30 min at 150° C.) | by weight |

Polyurethane dispersion 2:

641 g of a commercially available caprolactonediol having a hydroxyl number of 112 and 48.2 g of dimethylolpropionic acid are dewatered in vacuo for 1 h at 110° C. The mixture is cooled to 80° C. and 177.6 g of isophorone diisocyanate are added at a rate such that the temperature does not exceed 85° C. The reaction mixture is held at this temperature until no further free isocyanate can be detected. The reaction mixture is heated to 100° C. and 76 g of tert-butyl acetoacetate are added dropwise. The temperature is raised over a period of 1.5 h to 150° C. and maintained until no further distillate is collected. To remove the residues of tert-butanol and unreacted starting material, a vacuum is applied.

To enable a dispersion of the resin, it is neutralized with 19.2 g of methyldiethanolamine. Using 1,383 g of fully deionized water, a fine stable dispersion with a solids content of 40% by weight is prepared. For chain-lengthening, 41 g of a 25% strength by weight solution of glutaraldehyde in water are added and the mixture is stirred for 2 h.

| Analytical characteristics: | |
|---|---|
| Acid No. (mg of KOH/g) | 25 |
| pH | 7.1 |
| Stoving residue | 39.8% |
| (30 min at 150° C.) | by weight |

Polyurethane dispersion 2a:

The procedure as described under 2 is followed, except that the polyol component used is a commercially available polycarbonate diol having a hydroxyl number of 112.

| Analytical characteristics: | |
|---|---|
| Acid No. (mg of KOH/g) | 25 |
| pH | 7.1 |
| Stoving residue | 39.7% |
| (30 min at 150° C.) | by weight |

Polyurethane dispersion 3:

748 g of a polyester of diethylene glycol, hexanediol, adipic acid and isophthalic acid having a hydroxyl number of 60 and an acid number of less than 3, together with 80.4 g of dimethylolpropionic acid, are dewatered for one hour at 100° C. The mixture is cooled to 80° C. and 209 g of bis(4-isocyanatocyclohexyl)methane are added at a rate such that the temperature does not exceed 85° C. The reaction temperature is maintained until no further isocyanate groups can be detected. For functionalization, 88 g of tert-butyl acetoacetate are added to the reaction mixture, the subsequent procedure being as described for 2.

For the transfer of the resin prepared in this way, the resin is added with thorough stirring to 1,619 g of fully deionized water containing 34 g of methyldiethanolamine. A fine dispersion is formed having a solids content of 40% by weight.

| Analytical characteristics: | |
|---|---|
| Acid No. (mg of KOH/g) | 35 |
| pH | 7.2 |
| Stoving residue | 40.1% |
| (30 min at 150° C.) | by weight |

Polyurethane dispersion 4:

The procedure of the preparation of the resin stage is as described for 3, except that the transfer to the dispersion is carried out using a rotor/stator mixer.

Polyurethane dispersion 5:

489 g of a polyester of neopentyl glycol, pentanediol and adipic acid, having a hydroxyl number of 90, together with 75 g of dimethylolpropionic acid are dried for one hour at 100° C. 178 g of isophorone diisocyanate are then added at 80° C. at a rate such that the temperature does not exceed 85° C. The reaction mixture is held at 85° C. until no further free isocyanate can he detected. Functionalization is then carried out as in 1, using 51.6 g of ethyl acetoacetate.

For conversion to an aqueous dispersion, 22.6 g of triethylamine are first added and stirred in thoroughly and then 1,194 g of fully deionized water are metered in. A fine polyurethane dispersion is formed having a solids content of 40% by weight.

For chain-lengthening, 16 g of glyoxal (30% by weight in water) are added and stirring is continued for 2 hours.

| Analytical characteristics: | |
|---|---|
| Acid No. (mg of KOH/g) | 40 |
| pH | 7.3 |
| Stoving residue | 39.5% |
| (30 min at 150° C.) | by weight |

Polyurethane dispersion 6:

489 g of a polyester of neopentyl glycol, pentanediol and adipic acid (having a hydroxyl number of 90) together with 75 g of dimethylolpropionic acid are dried for one hour at 100° C. 178 g of isophorone diisocyanate are then added at 80° C. at a rate such that the temperature does not exceed 85° C. The reaction mixture is held at 85° C. until no further free isocyanate groups can be detected. Functionalization is then carried out using 45 g of ethyl cyanoacetate. 45 g of ethyl cyanoacetate are added at 80° C. and the temperature is raised over a period of 2 h to 160° C. This temperature is maintained until the reaction ceases. To remove residues of unreacted starting material and ethanol, a vacuum is applied for a short time. For transfer to the aqueous dispersion, first of all 22.6 g of triethylamine are thoroughly incorporated. A fine aqueous dispersion is then prepared using fully deionized water.

For chain-lengthening, 16 g of glyoxal solution (30% by weight in water) are added and the mixture is stirred for 2 h.

| Analytical characteristics: | |
|---|---|
| Acid No. (mg of KOH/g) | 39 |
| pH | 7.4 |
| Stoving residue | 39.5% |
| (30 min at 150° C.) | by weight |

Polyurethane dispersion 7:

A urethane diol is first prepared as described in Example 1, from 518 g of polyester, 54 g of dimethylolpropionic acid and 178 g of isophorone diisocyanate; this urethane diol is subsequently functionalized with 75 g of ethyl acetoacetate.

Prior to neutralization with 20.2 g of triethylamine, 10 g of trimethylolpropane triacetoacetate are added to the resin, and the mixture is thoroughly homogenized. Then the stated amount of neutralizing agent is added and a stable fine dispersion having a solids content of 40% by weight is prepared using 1221 g of fully deionized water.

For chain-lengthening, 19.7 g of formaldehyde solution (37% by weight in water) are added, and the mixture is stirred for 2 h.

| Analytical characteristics: | |
|---|---|
| Acid No. (mg of KOH/g) | 30 |
| pH | 7.3 |
| Stoving residue | 40.2% |
| (30 min at 150° C.) | by weight |

Polyurethane dispersion 8:

In a reaction vessel with stirrer, internal thermometer, heating and a reflux condenser, 250 g of a linear polyester (composed from adipic acid, isophthalic acid and hexanediol; hydroxyl number 77, acid number 10) are heated with 80 g of methyl ethyl ketone and 53.3 g of N-methylpyrrolidone to 70° C., and at this temperature 74 g of hydrogenated bisphenol A and 28.3 g of dimethylolpropionic acid are added. The batch is heated to 120° C., stirred at this temperature for half an hour, and dewatered in vacuo. 146.7 g of hexamethylene diisocyanate are then added at 70° C. After the exothermic reaction (<90° C.) has subsided, the batch is held at 90° C. until a free isocyanate content of 1.8% is reached. At this point in time, 41 g of an adduct of 1 mol of neopentylglycol and 1 mol of ethyl acetoacetate are added. The mixture is stirred at 90° C. until no further free isocyanate groups can be detected.

The mixture is neutralized at 60° C. using 18.1 g of triethylamine and a fine polyurethane dispersion having a solids content of 30% by weight is prepared using 1,242 g of fully deionized water. This dispersion is chain-lengthened using 8.5 g of glyoxal (30% by weight solution in water), by stirring the mixture for 3 hours at room temperature.

| Analytical characteristics: | |
|---|---|
| Acid No. (mg of KOH/g) | 24 |
| pH | 7.3 |
| Stoving residue | 29.6% |
| (30 min at 150° C.) | by weight |

Application Example:

Based on the polyurethane dispersions 1 to 8 described, aqueous basecoats were formulated by way of example.

As a preliminary test for automotive OEM finishing the basecoats are applied to test panels which have been pretreated as follows:

1. degreasing
2. pretreatment (e.g. phosphatization)
3. application of a corrosion protection coat with a commercially available cathodic electrodeposition primer, and subsequent drying under hot conditions
4. coating with a commercially available automotive production-line filler, followed by drying.

The basecoat (10 to 15 μm dry film thickness) is flushed off for 10 minutes at room temperature and then subjected to preliminary drying for 6 minutes at 80° C. in a circulating-air oven. It is then coated over with various clearcoats (30 to 50 μm dry film thickness), and the complete topcoat layer, comprising basecoat and clearcoat, is dried together at 130° C. in a circulating-air oven. The clearcoats are, on the one hand, commercially available 1-component polyester or polyacrylate/melamine resin systems and, on the other hand, commercially available 2-component isocyanate formulations.

The basecoats containing the polyurethane dispersions according to the invention are distinguished by the following favourable application properties: water-dilutability without problems, low cosolvent requirement, outstanding atomization characteristics on application using a cup-type spray gun, and an excellent metallic effect.

The dispersions according to the invention have also been used in coating compositions for coating plastics and in automotive refinishing, with the specific substrates and application conditions being taken into account. The coating procedure was distinguished by the same outstanding features as described above.

We claim:

1. Aqueous coating composition which is self-drying or crosslinks by means of external agents, comprising I) 40 to 100% by weight of a film-former in the form of an aqueous dispersion of one or more polyurethane resins having a number-average molecular mass (Mn) of from 2,500 to 1,000,000 and a content of ionic groups, groups which have been converted to ionic groups, and/or hydrophilic groups of from 5 to 200 meq per 100 g of solid resin, and at least one CH-acidic group per molecule, and a OH-number of 0 to 100, wherein some or all of the CH-acid groups can be reacted with one or more compounds which are able to react with at least two CH-acid groups for chain-lengthening, and II) 60 to 0% by weight of one or more crosslinkers which can react with at least two CH-acidic groups, formaldehyde condensation resins and/or polyisocyanates containing free or blocked isocyanate groups, the percentages by weight of I) and II) relating to the resin solids content and adding up to 100% by weight, and optionally pigments, fillers, organic solvents and/or conventional coating additives.

2. Aqueous coating composition according to claim 1, in which the compounds of component I) which can react with at least two CH-acidic groups are aldehydes containing one or more aldehyde functions and/or free or blocked polyisocyanates containing an average at least 1.5 isocyanate functions per molecule.

3. Aqueous coating composition according to claim 2, in which the aldehyde is formaldehyde and/or glyoxal and the polyisocyanate is a diisocyanate.

4. Aqueous coating composition according to claim 1, in which the polyurethane resin is chain-lengthened via the CH-acidic groups and has a number-average molecular mass (Mn) of from 30,000 to 1,000,000.

5. Aqueous coating composition according to claim 1, which contains in component I) one or more additional binders in an amount of up to 95 % by weight of the resin solids content of component I).

6. Aqueous coating composition according to claim 1, in which component I) contains one or more di- and/or polyamines containing primary and/or secondary amino groups.

7. Process for the preparation of component I) according to claim 1, having a number-average molecular mass (Mn) of from 5000 to 1,000,000 and a content of ionic groups, groups which can be converted to ionic groups, and/or hydrophilic groups of from 5 to 200 meq per 100 g of solid resin, characterized in that one or more water-dispersible polyurethane resins containing ionic groups, groups which can be converted to ionic groups, and/or hydrophilic groups and at least one CH-acidic group per molecule and having a number-average molecular mass (Mn) of from 2500 to 50,000 is or are reacted in an aqueous or nonaqueous medium with one or more compounds which can react with at least two CH-acidic groups for chain-lengthening, and a reaction product obtained in a nonaqueous medium is optionally transferred to the aqueous phase.

8. Process according to claim 7 characterized in that the compound which can react with two CH-acidic groups is an aldehyde containing one or more aldehyde functions and/or a polyisocyanate containing on average at least 1.5 isocyanate functions per molecule.

9. Process for the preparation of component I) according to claim 1, characterized in that one or more polyurethane resins which contain hydroxyl groups and may contain urea groups, and contain at least one ionic group, group capable of ion formation and/or hydrophilic group per molecule and has an OH number of from 10 to 150 is or are reacted in an anhydrous medium with one or more compounds containing at least one functional group which is suitable for reaction with OH groups and contains at least one CH-acidic group, and some or all of the groups capable of ion formation which are present in the resulting product are converted to the ionized form, and the resulting product is transferred to the aqueous phase.

10. Process according to claim 9, characterized in that the compound which is reactive with OH groups and contains at least one CH-acidic group is a carboxylic acid containing CH-acidic groups, an activated derivative thereof, a diketone or a diketene adduct, optionally together with alcohols and esterification auxiliaries.

11. The process of claim 8, wherein said aldehyde or polyisocyanate is one or more of formaldehyde, glyoxal, or a diisocyanate.

12. A process for the preparation of a multicoat finish on a substrate by applying a basecoat and applying thereon a clear coat, wherein the basecoat is an aqueous coating composition which is self-drying or crosslinks by means of external agents and which comprises, in combination:

I) 40 to 100% by weight of a film-former in the form of an aqueous dispersion of one or more polyurethane resins having a number-average molecular mass (Mn) of from 2,500 to 1,000,000 and a content of ionic groups, groups which can be converted to ionic groups, and/or hydrophilic groups of from 5 to 200 meg per 100 g of solid resin, and have at least one CH-acidic group per molecule, and a OH-number of 0 to 100, wherein some or all of the CH-acidic groups have optionally been reacted with one or more compounds which are able to react with at least two CH-acid groups for chain-lengthening, and II) 60 to 0% by weight of one or more crosslinkers compounds which can react with at least two CH-acidic groups, from formaldehyde condensation resins and/or polyisocyanates containing free or blocked isocyanate groups, the percentages by weight of I) and II) relating to the resin solids content and adding up to 100% by weight.

13. The process of claim 12 where the aqueous coating composition further contains a member of the group consisting of pigments, fillers, organic solvents and coating additives.

14. A process for coating industrial tools, automobile or parts thereof employing the process of claim 13.

* * * * *